2,816,844

CERAMIC COMPOSITIONS

Harry T. Bellamy, Evanston, Ill.

No Drawing. Application November 9, 1953,
Serial No. 391,110

10 Claims. (Cl. 106—44)

This invention relates to ceramic compositions characterized by high strength, relatively low shrinkage, high resistance to thermal shock and which, prior to firing, may be tempered with water to form readily moldable plastic mixes. These compositions are especially suitable for linings for metal vessels or crucibles and for highly refractory molded parts.

Normally, ceramic compositions for metal pot or crucible linings are prepared from a mixture of mineral aggregate, clay or bentonite, and a binder like sodium silicate. This clay-type mix is tempered with water to brushing consistency and applied in multiple coats to the surface of the article to be lined with ceramic material. Upon drying and firing, ceramic compositions of this kind which contain sufficient binder to produce a hard coating have a tendency to crack and spawl from the metal vessel due to excessive shrinkage. In making molded ceramic parts such as tubes, by shaping such ceramic compositions around a mandrel or core, the shaped ceramic likewise splits and cracks upon drying and firing due to shrinkage and lack of elasticity.

So far as I am aware, prior to my invention low shrinkage thermal-shock-resistant ceramic compositions, which are also capable of being prepared as a plastic mass that can be formed or shaped, were not known. To reduce the shrinkage, it is necessary to reduce the quantity of clay or bentonite present in the mixture, but when the quantity of clay or bentonite is reduced to the point where the shrinkage is tolerable, the mixture loses its plasticity and is no longer formable.

The compositions of my invention obviate this problem, being characterized by good plasticity when tempered with water in the green or forming stage, and by remarkably low shrinkage upon drying and firing after molding. These novel compositions comprise a major proportion of mineral aggregate in combination with a minor proportion of fibrous talc which serves as the bonding agent both in the green and fired states. The fibrous talc may be used alone, or, under certain conditions, in admixture with clay and alumina. The combination binder comprising fibrous talc, clay and alumina when used with a mineral aggregate having a low coefficient of expansion such as silicon carbide, results in a ceramic having exceptional resistance to thermal shock. Where the ceramic composition forms part of an article that will not withstand the high firing temperatures required to flux fibrous talc, it is necessary to add a material such as sodium silicate, which fluxes at a temperature below 2000° F., say 1300° to 1500° F.

Fibrous talc is a peculiar mineral which occurs in nature, particularly in St. Lawrence County, New York, as a laminated mass of interlocked bundles of fibers in crystalline lime stone. For purposes of the invention I employ fibrous talc in comminuted form. Although the particles are relatively small and can be homogeneously mixed with other ingredients, the peculiar fibrous structure is retained up to the temperature at which the talc fuses. Chemically, fibrous talc is similar to soapstone and other granular talcs, being essentially magnesium silicate. It has the chemical formula $$3MgO \cdot 4SiO_2 \cdot 2H_2O$$

Fibrous talc suitable for practicing this invention may be purchased from International Talc Company under the name "Fiber Special." This material consists of fibers having a maximum length of approximately $\frac{1}{16}''$. This material was used in formulating the compositions set forth in the examples below.

Because of its physical structure, fibrous talc is capable of absorbing and retaining moisture to render the ceramic composition in which it is incorporated plastic and readily formable. It is for this reason that fibrous talc can be substituted for part or all of the clay normally used in ceramic compositions to impart plasticity thereto. The compositions of my invention may be formed into articles by ramming or "dry-pressing" the damp powder in molds, or, in "stiff mud form," it may be shaped over metal parts such as a mandrel and dried thereon without any cracking or splitting, which is common where clay binder is used. By adding a relatively large quantity of water the compositions may be thinned to brushing consistency and brushed onto the surface of a metal pot or similar vessel to form a lining therefor. Successive coats are applied to build up the desired thickness, permitting the water to evaporate between coats, preferably by placing the pot or crucible in an oven. No excessive shrinkage occurs during the drying period. By "excessive shrinkage" is meant the degree of shrinkage that will produce cracks and/or separations. Upon firing, the ceramic composition forms a protective lining for the metal vessel which will not separate therefrom during use, even upon subjection to extreme variations in temperature.

The mineral aggregates used in combination with the fibrous talc binder in preparing the high temperature maturing compositions of my invention, preferably have a softening point in excess of 3000° F. Furthermore, the aggregate must be one that does not lower the softening point of the fibrous talc. Suitable mineral aggregates include such materials as silicon carbide, zirconium silicate, zirconium oxide and magnesium oxide. For lower maturing temperature compositions there are many suitable aggregates such as firebrick grog, sillimanite, and oxides of aluminum and silicon.

In preparing my ceramic compositions, 50 to 95 parts by weight of the mineral aggregate are mixed with from 50 to 5 parts of fibrous talc binder in a suitable mixing apparatus. A more refractory composition contains from 60 to 95 parts of mineral aggregate (e. g. zircon or silicon carbide) and correspondingly from 40 to 5 parts by weight of fibrous talc. Sufficient water is added to make a plastic doughy mass, or a liquid suspension if a brushing composition is desired. The amount of water added is generally increased in proportion to the amount of talc, and may range from 20 to 75 parts per 100 parts of solids. The composition prepared in this manner is then applied to the part to which it will be fired or is shaped into the desired form if it is to be fabricated alone, whereupon it is fired at a temperature required to properly harden the composition.

In cases where a metal vessel is to be lined with the ceramic composition and the metal is not able to withstand the high temperature required to flux fibrous talc, it becomes necessary to modify the binder by adding a fluxing agent so that the composition will harden at a lower temperature. For example, 1300° to 1500° F. is a satisfactory firing range for coatings for iron pots. A suitable fluxing agent of this nature is sodium silicate in the form of a very fine powder, 90% insoluble in water. This sodium silicate is sold by E. I. du Pont de Nemours & Company under the name "Technical Glass F Powder," and contains 75.8% SiO₂ and 23.3% Na₂O, the remainder being impurities. About 15% of such sodium silicate, 25% fibrous talc, and 3% of an organic binder, such as lignin resin derived from waste sulfite liquor, are mixed with 57% mineral aggregate, all percentages being by weight. The organic binder improves the green strength of the mixture. Sufficient water is added to produce a pasty mass, or a slurry if desired, and the wet material is applied to the surface of the pot with trowel or brush. This composition will harden at around 1300° to 1400° F. Low temperature fluxing agents also include other forms of sodium silicate, or glazes, or enamels, well known in the art. In all of these low-temperature fluxing compositions the fibrous talc is responsible for imparting the plasticity to the green mix. After firing, the fibers retain their individuality to lock the aggregate particles together and impart a certain degree of flexibility to the composition so it will expand and contract with the metal surface to which it is applied. Preferably, these modified binders should contain a major proportion of fibrous talc. The range of proportions is as follows: 5–25% fibrous talc, 5–25% fluxing agent, and correspondingly from 90–50% mineral aggregate.

A fired composition having an exceptionally low thermal coefficient of expansion may be prepared from 50 to 90% by weight of mineral aggregate and correspondingly from 50 to 10% of a binder having the following composition: fibrous talc, 48%; kaolin or clay, 40.0%; and aluminum oxide, 12.0%. The proportions set forth for the binder constitute essentially cordierite, $$2MgO \cdot 2Al_2O_3 \cdot 5SiO_2$$

and are critical. The thermal shock resistance of the fired composition is especially good when the binder mixture comprises about 25% of the composition. This composition is best fired at a temperature of about 2550° F.

Specific examples which illustrate various forms of the invention are set forth below.

*Example 1*

A cast iron pot used for melting aluminum or other white metals was sandblasted to provide a clean surface to be coated with a ceramic lining. The sandblasted surface was then coated by brushing on a low temperature fluxing composition having the following formula:

| Ingredients: | Parts by weight |
|---|---|
| Fibrous talc powder | 25 |
| Powdered sodium silicate (75.8% SiO₂, 23.3% Na₂O; 90% insoluble) | 15 |
| Silicon carbide (−300 mesh) | 25 |
| Silicon carbide (−50 +300 mesh) | 33 |
| Water | 50–75 |

All of the ingredients were mixed together in a suitable container, no particular order of addition being observed. The viscosity of the mixture was adjusted to brushing consistency by adding the proper amount of water. A sufficient number of coats were applied to the sandblasted surface by brushing or other means to build up a thickness of from 1/16 to 3/16 inch. Between coats, the pot was heated to evaporate the moisture from the lining, care being taken to avoid blistering due to excessive temperature. I found that about 1/32 of an inch thickness is built up with each coat. After the last coat was brushed on, the pot was fired at between 1300° to 1400° F. for approximately one hour. The fired pot had a hard tough ceramic lining characterized by good heat-conductivity and chemical resistance to the aluminum alloys to be melted therein. Above all, the lining was continuous and did not crack or spawl in use as is usually the case where clay compositions are used. Apparently the lining had enough elasticity to expand and contract with the metal wall of the pot.

*Example 2*

Compositions suitable for refractory shapes and pyrometer tubes of moderate shock resistance were prepared in accordance with the following recipe:

| Ingredients: | Parts by weight |
|---|---|
| Silicon carbide (−50 +100 mesh) | 60 |
| Fibrous talc powder | 20 |
| Silicon carbide fines (−300 mesh) | 18 |
| Lignite binder (sulfite liquor derivative) | 2 |
| Water | 20–25 |

This composition was mixed in a dough-type mixer to form a plastic mass which was extruded over a mandrel into tubes in an extruding apparatus such as that described in my copending application Serial No. 361,603, filed June 15, 1953. The tubes were fired at 2650° F., at which temperature the fibrous talc acts as a flux. No cracking occurred during firing. The resultant article had excellent resistance to the chemical action of molten aluminum and sufficient thermal shock resistance to permit inserting the tube from air at room temperature into molten aluminum at approximately 1400° F.

*Example 3*

To prepare an extremely high refractory composition such as that used for pyrometer tubes, the following formulation was used:

| Ingredients: | Parts by weight |
|---|---|
| Zircon (−50 +200 mesh) | 46 |
| Zircon (−200 mesh) | 46 |
| Fibrous talc powder | 8 |
| Water | 25 |

This composition was mixed in the same manner as those in previous examples, but was not quite as plastic as those which contained a larger portion of fibrous talc. However, it was capable of being extruded on the apparatus above mentioned. This composition was fired at 2750° F. The structure of the fired article was dense. It had fairly good shock resistance, much better than porcelain for instance, and was found to be useful at temperatures up to 2750° F.

*Example 4*

To prepare a composition for greatest thermal shock resistance and a very low coefficient of expansion the following formulation was used:

| Ingredients: | Parts by weight |
|---|---|
| Silicon carbide (−50 +100 mesh) | 60 |
| Silicon carbide (−300 mesh) | 17 |
| Fibrous talc powder | 12 |
| Ball clay or kaolin | 2.5 |
| (Al₂O₃), 300 mesh | 5.4 |
| Corn flour | 2 |
| Water | 25 |

The above composition was mixed in a dough-type mixer to form a plastic mass and extruded as in Example 2 to form tubes. The tubes, after firing at 2550° F., had excellent resistance to thermal shock and a low coefficient of thermal expansion.

The formula of this example was designed to produce a bonding material that is essentially cordierite, $2MgO \cdot 2Al_2O_3 \cdot 5SiO_2$, which gives a tough strong bond. The apparent excess of Al₂O₃, over the amount required to form this compound, was employed to combine with the free silica in the 77% silicon carbide, and the aluminum silicate thus formed reduces the quantity of clay or kaolin to be added. Without the fibrous talc this composition would not have sufficient green strength to permit shaping or extruding.

It is apparent that by the use of fibrous talc, both alone and in combination with other materials in accordance with this description, fired ceramic compositions having unusually low thermal expansion, and great toughness can be produced. Furthermore, the compositions possess good green strength so that they can be shaped and formed without difficulty. Those skilled in the art will recognize that various modifications in the formulations may be made without departing from the basic concept of this invention. Therefore, it is not my intention to limit the invention other than as required by the scope of the appended claims.

I claim:

1. A ceramic composition characterized by its lack of shrinkage both before and after firing, and by its high refractoriness after firing, consisting essentially of 95 to 50% finely divided mineral aggregate and correspondingly from 5 to 50% of fibrous talc by weight.

2. A fired ceramic composition which hardens at below 2000° F. prepared from a composition, consisting essentially of 90 to 50% of a finely divided mineral aggregate, 5 to 25% fibrous talc and from 5 to 25% of a fluxing agent that fluxes below 1500° F., said percentages being by weight.

3. A fired ceramic composition which hardens at below 2000° F., consisting essentially of 90 to 50% of a finely divided mineral aggregate, 5 to 25% fibrous talc and from 5 to 25% sodium silicate, which is 90% water-insoluble, said percentages being by weight.

4. A ceramic composition characterized by its lack of shrinkage both before and after firing, and by its high refractoriness after firing, consisting essentially of 95 to 50% silicon carbide, and correspondingly from 5 to 50% of fibrous talc by weight.

5. A fired ceramic composition consisting essentially of 60 to 95% zircon and from 40 to 5% fibrous talc by weight.

6. A fired ceramic composition consisting essentially of 60 to 95% silicon carbide and correspondingly from 40 to 5% fibrous talc by weight.

7. A fired ceramic composition characterized by high resistance to thermal shock consisting essentially of 50 to 90% mineral aggregate, the balance being a bonding material consisting of substantially 48% fibrous talc, 40.0% hydrous aluminum silicate and 12.0% aluminum oxide, said percentages being by weight.

8. A fired ceramic composition characterized by high resistance to thermal shock consisting essentially of 50 to 90% silicon carbide aggregate, the balance being a bonding material consisting of substantially 48% fibrous talc, 40.0% hydrous aluminum silicate and 12.0% aluminum oxide, said percentages being by weight.

9. A fired ceramic composition characterized by high resistance to thermal shock consisting essentially of about 75% silicon carbide and 25% of a bonding material comprising substantially 48% fibrous talc, 40.0% aluminum silicate and 12.0% aluminum oxide.

10. A plastic moldable ceramic composition capable of being converted by heat into an article having a low coefficient of thermal expansion consisting essentially of 95 to 50 parts of finely divided mineral aggregate having a softening point above 3000° F., 50 to 5 parts of a binder containing a major proportion of fibrous talc, and 20 to 75 parts of water, said parts being by weight.

References Cited in the file of this patent

FOREIGN PATENTS

| | | |
|---|---|---|
| 396,532 | Great Britain | 1933 |
| 284,315 | Switzerland | 1952 |
| 691,368 | Great Britain | 1953 |
| 702,943 | Great Britain | 1954 |

OTHER REFERENCES

Danas' Textbook of Mineralogy, 4th ed. (1932), pages 677–678.